US008503761B2

(12) United States Patent
Akbari et al.

(10) Patent No.: US 8,503,761 B2
(45) Date of Patent: Aug. 6, 2013

(54) GEOSPATIAL MODELING SYSTEM FOR CLASSIFYING BUILDING AND VEGETATION IN A DSM AND RELATED METHODS

(75) Inventors: Morteza Akbari, Rockledge, FL (US); Mark Rahmes, Melbourne, FL (US); Patrick Kelley, Palm Bay, FL (US); Brian Hicks, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 810 days.

(21) Appl. No.: 12/616,948

(22) Filed: Nov. 12, 2009

(65) Prior Publication Data

US 2011/0110580 A1 May 12, 2011

(51) Int. Cl.
*G06K 9/00* (2006.01)
(52) U.S. Cl.
USPC ............................................... 382/154
(58) Field of Classification Search
None
See application file for complete search history.

(56) References Cited

U.S. PATENT DOCUMENTS

| 6,654,690 | B2 | 11/2003 | Rahmes et al. | 702/5 |
|---|---|---|---|---|
| 7,142,984 | B2 | 11/2006 | Rahmes et al. | 702/5 |
| 7,191,066 | B1 | 3/2007 | Rahmes et al. | 702/5 |
| 7,310,606 | B2 | 12/2007 | Nemethy et al. | 705/5 |
| 2003/0023412 | A1 | 1/2003 | Rappaport et al. | 703/1 |
| 2007/0291994 | A1 | 12/2007 | Kelle et al. | 382/110 |
| 2008/0133195 | A1 | 6/2008 | Rahmes et al. | 703/11 |
| 2009/0060319 | A1 | 3/2009 | Cocosco et al. | 382/154 |
| 2009/0210205 | A1 | 8/2009 | Sullivan et al. | 703/6 |

OTHER PUBLICATIONS

Ding, M., Lyngbaek, K., & Zakhor, A. (2008). Automatic registration of aerial imagery with untextured 3d lidar models. In Proc. of the IEEE conf. On computer vision and pattern recognition (CVPR).*
D. K. San and M. Turker, "Automatic building extraction from high resolution stereo satellite images," in Proc. Conf. Inf. Extraction From SAR Opt. Data With Emphasize Developing Countries, Istanbul, Turkey, May 2007.*
Chen, L.C., Chiang, T.W., and Teo, T.A., 2005. "Fusion of LIDAR data and high resolution images for forest canopy modeling", Proceedings of Asian Conference on Remote Sensing, Nov. 7-11, Hanoi, Vietnam, CD-ROM.*
Zhang, et al., "Detecting urban vegetation from IKONOS data using an object-oriented approach," IEEE, 2005.
Haala et al., "Extraction of Buildings and Trees in Urban Environments", ISPRS Journal of Photogammetry and Remote Sensing, vol. 54, No. 2-3, Jul. 1999, pp. 130-137.
Lu et al., "Data Fusion Applied to Automatic Building Extraction in 3D Reconstruction", ASPRS Annual Conference, May 2003, pp. 114-122.

(Continued)

*Primary Examiner* — Nirav G Patel
(74) *Attorney, Agent, or Firm* — Allen, Dyer, Doppelt, Milbrath & Gilchrist, P.A.

(57) ABSTRACT

A geospatial modeling system may include a geospatial model database configured to store a digital surface model (DSM) of a geographical area, and to store image data of the geographical area. The image data may have a spectral range indicative of a difference between buildings and vegetation. The geospatial modeling system may also include a processor cooperating with the geospatial model database to separate bare earth data from remaining building and vegetation data in the DSM to define a building and vegetation DSM. The processor may also register the image data with the building and vegetation DSM, and classify each point of the building and vegetation DSM as either building or vegetation based upon the spectral range of the image data.

15 Claims, 9 Drawing Sheets

OTHER PUBLICATIONS

Rottensteiner et al., "Using the Dempster-Shafer Method for the Fusion of Lidar Data and Multi-Spectral Images for Building Detection", Information Fusion, Elsevier, vol. 6, No. 4, Dec. 2005, pp. 283-300.

Schowengerdt, "Remote Sensing-Models and Methods for Image Processing", Elsevier, 2007, pp. 186-190.

Theodoridis et al., "Pattern Recognition", Academic Press, 1999, pp. 480-484.

* cited by examiner

GEOSPATIAL MODELING SYSTEM FOR CLASSIFYING BUILDING AND VEGETATION IN A DSM AND RELATED METHODS

FIELD OF THE INVENTION

The present invention relates to the field of geospatial modeling, and, more particularly, to processing digital surface models and related methods.

BACKGROUND OF THE INVENTION

Topographical models of geographical areas may be used for many applications. For example, topographical models may be used in flight simulators and other planning missions. Furthermore, topographical models of man-made structures, for example, cities, may be extremely helpful in applications, such as, cellular antenna placement, urban planning, disaster preparedness and analysis, and mapping.

Various types of topographical models are presently being used. One common topographical model is the digital elevation model (DEM). A DEM is a sampled matrix representation of a geographical area, which may be generated in an automated fashion by a computer. In a DEM, coordinate points are made to correspond with a height value. DEMs are typically used for modeling terrain where the transitions between different elevations, for example, valleys, mountains, are generally smooth from one to another. That is, a basic DEM typically models terrain as a plurality of curved surfaces and any discontinuities therebetween are thus "smoothed" over. Another common topographical model is the digital surface model (DSM). The DSM is similar to the DEM but may be considered as further including details regarding buildings, vegetation, and roads, in addition to information relating to terrain.

One particularly advantageous 3D site modeling product is RealSite®, as available from the Harris Corporation of Melbourne, Fla. (Harris Corp.), the assignee of the present application. RealSite® may be used to register overlapping images of a geographical area of interest and extract high resolution DEMs or DSMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR), for example.

Another similar system available from the Harris Corp. is LiteSite®. LiteSite® models provide automatic extraction of ground, foliage, and urban digital elevation models (DEMs) from LIDAR and synthetic aperture radar (SAR)/interfermetric SAR (IFSAR) imagery. LiteSite® can be used to produce affordable, geospatially accurate, high-resolution 3-D models of buildings and terrain.

U.S. Pat. No. 6,654,690 to Rahmes et al., which is also assigned to the present assignee and is hereby incorporated herein in its entirety by reference, discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

In some applications, it may be desirable to separate the building and vegetation data in DSMs. Indeed, the aforementioned LiteSite® system may separate the building and vegetation data in DSMs generated from LIDAR data. This functionality is typically partially automated using computer processes, which is desirable given the significant size of most DSMs. A potential drawback to this approach is the use of LIDAR DSMs since such DSMs are expensive and time consuming to collect since a LIDAR enabled mobile platform is tasked to cover the geographical areas.

Nonetheless, such automated functionality may not be available when the DSMs are generated stereographically, i.e. being generated using overlapping images of a geographical area of interest. In these stereographic DSMs, a user typically reviews the DSM manually and separates the building and vegetation data by annotating the DSM. This approach may be time consuming, labor intensive, and expensive.

SUMMARY OF THE INVENTION

In view of the foregoing background, it is therefore an object of the present invention to provide a geospatial modeling system that can efficiently and readily separate building and vegetation data in a digital surface model (DSM).

This and other objects, features, and advantages in accordance with the present invention are provided by a geospatial modeling system comprising a geospatial model database configured to store a DSM of a geographical area, and store image data of the geographical area. The image data may have at least one spectral range indicative of a difference between buildings and vegetation. The geospatial modeling system may also include a processor cooperating with the geospatial model database. The processor may be configured to separate bare earth data from remaining building and vegetation data in the DSM to define a building and vegetation DSM, register the image data with the building and vegetation DSM, and classify each point of the building and vegetation DSM as either building or vegetation based upon the at least one spectral range of the image data. Advantageously, the geospatial modeling system may separate building and vegetation in most DSMs, including, for example, stereographic DSMs.

More particularly, the processor may be configured to correlate a plurality of image pixels from the image data to a given point in the building and vegetation DSM, and to form a voting space including the correlated plurality of image pixels. Further, the processor may be configured to classify each point of the building and vegetation DSM by at least classifying each pixel of the voting space as either building or vegetation based upon comparison to a threshold. Also, the processor may be configured to classify each point of the building and vegetation DSM by at least determining the given point as vegetation if a majority of the plurality of image pixels of the voting space is classified as vegetation. Further, the given point is determined as a building if a majority of the plurality of image pixels of the voting space is classified as building.

In some embodiments, the classifying of each pixel may comprise determining a normalized difference vegetation index value for each pixel of the image data. For example, the DSM of the geographical area may comprise a stereographic DSM.

Also, for example, the image data may comprise multi-spectral image data, and the multi-spectral image data may comprise red and near-infrared spectrum data. The image data may comprise at least one of red, green, and blue (RGB) image data.

Another aspect is directed to a computer implemented method for geospatial modeling using a geospatial model database. The geospatial model database may store a DSM of a geographical area, and image data of the geographical area. The image data may have at least one spectral range indicative of a difference between buildings and vegetation. The method may comprise using a processor to separate bare earth data from remaining building and vegetation data in the DSM to define a building and vegetation DSM. The method may also include using the processor to register the image data with the building and vegetation DSM, and using the processor to classify each point of the building and vegetation DSM as either building or vegetation based upon the at least one spectral range of the image data.

BRIEF DESCRIPTION OF THE DRAWINGS

FIGS. 5A and 5B are images illustrating a false colored image of a geographical area and an image of a vegetation mask for the geographical area, respectively, in the geospatial modeling system of FIG. 2.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a geospatial modeling system 20 according to the present invention is now described. The geospatial modeling system 20 illustratively includes a geospatial model database 21, a processor 22, illustrated as a personal computer (FIG. 1), coupled thereto, and a display 23 also coupled to the processor 22. By way of example, the processor 22 may be a central processing unit (CPU) of a PC, Mac, or other computing workstation. In some advantageous embodiments, the processor 22 may comprise a parallel processing core.

Figure 1:
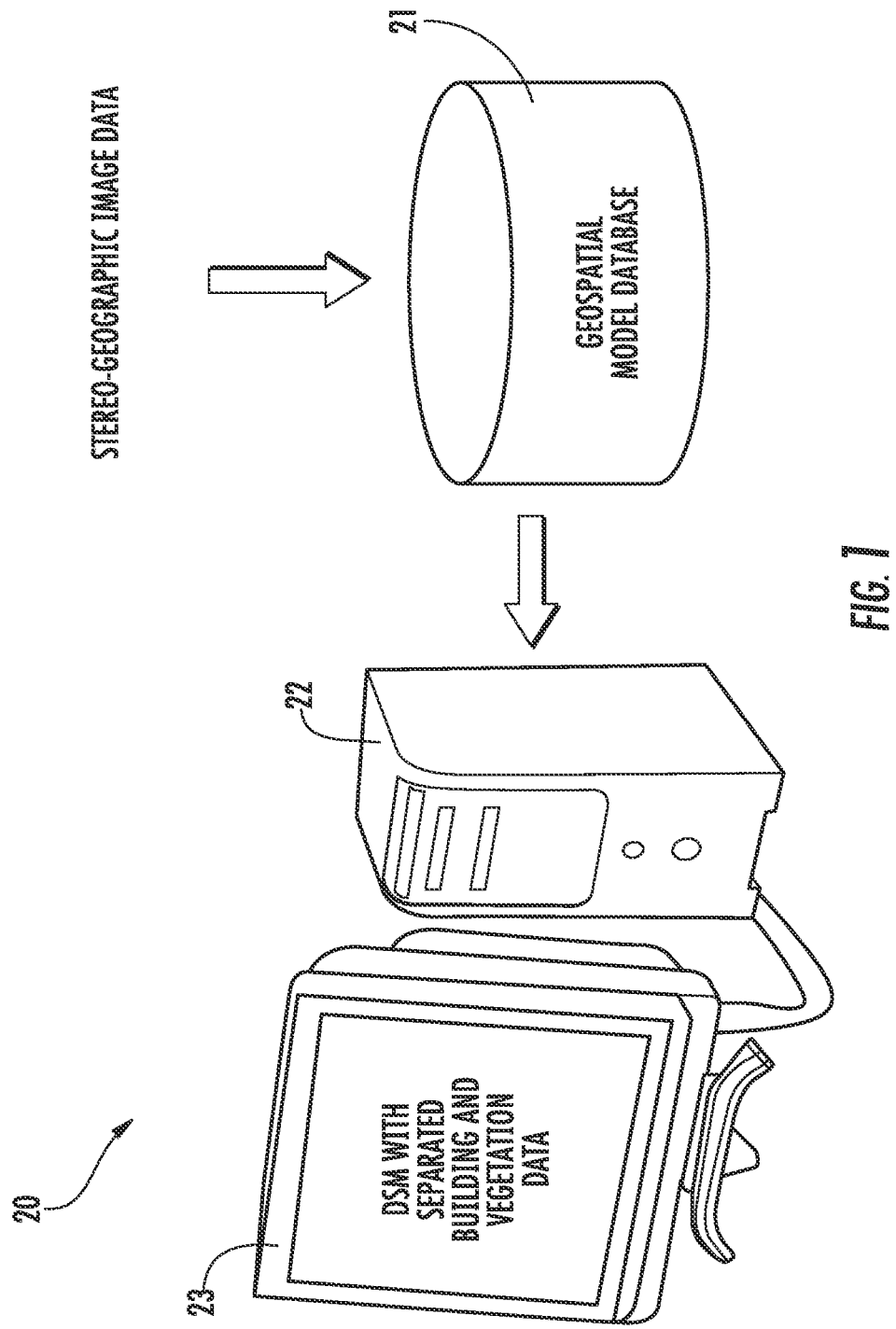
FIG. 1 is a schematic diagram of a geospatial modeling system according to the present invention.
Figure 2:
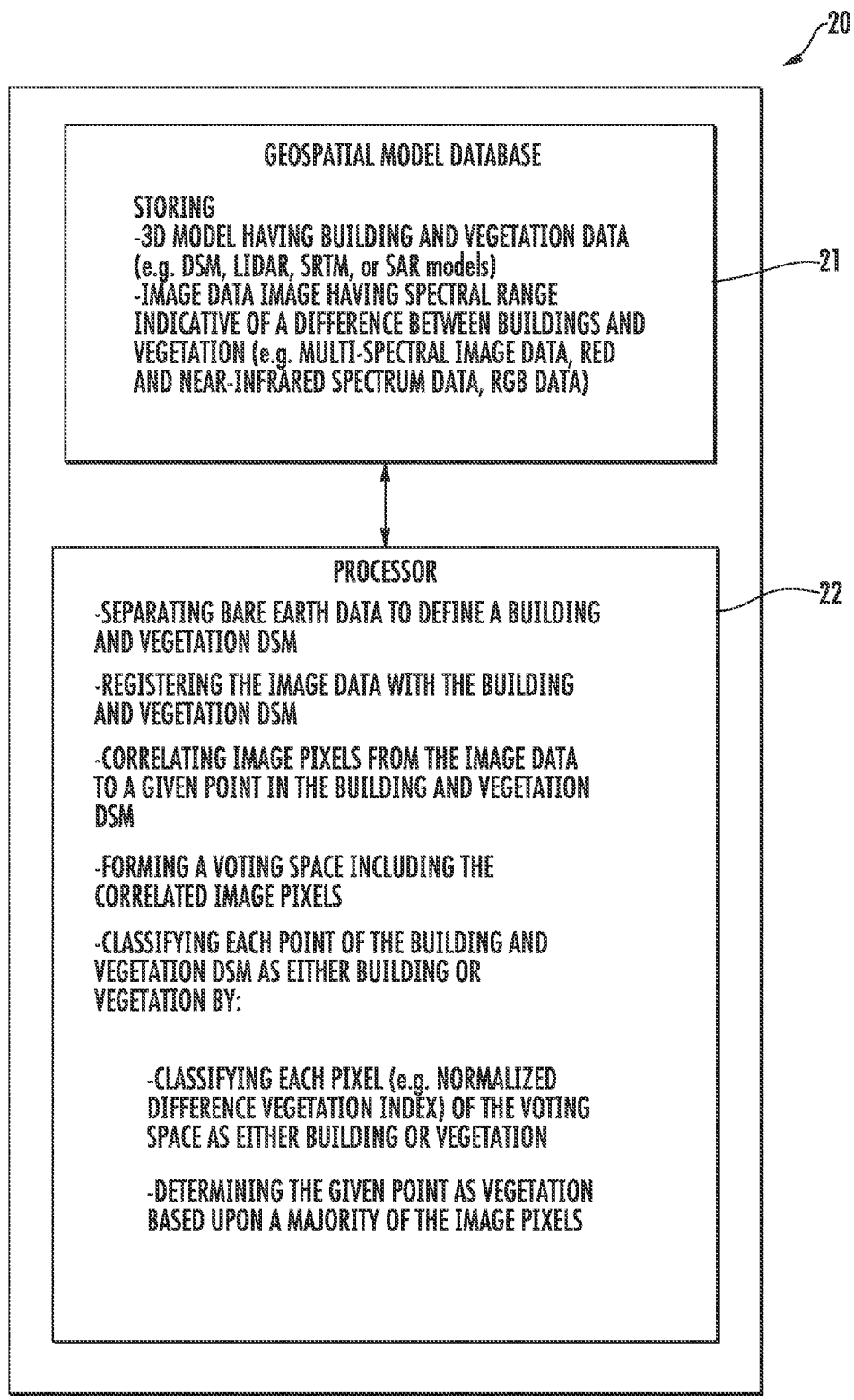
FIG. 2 is a more detailed schematic block diagram of the geospatial modeling system of FIG. 1.
Figure 3:
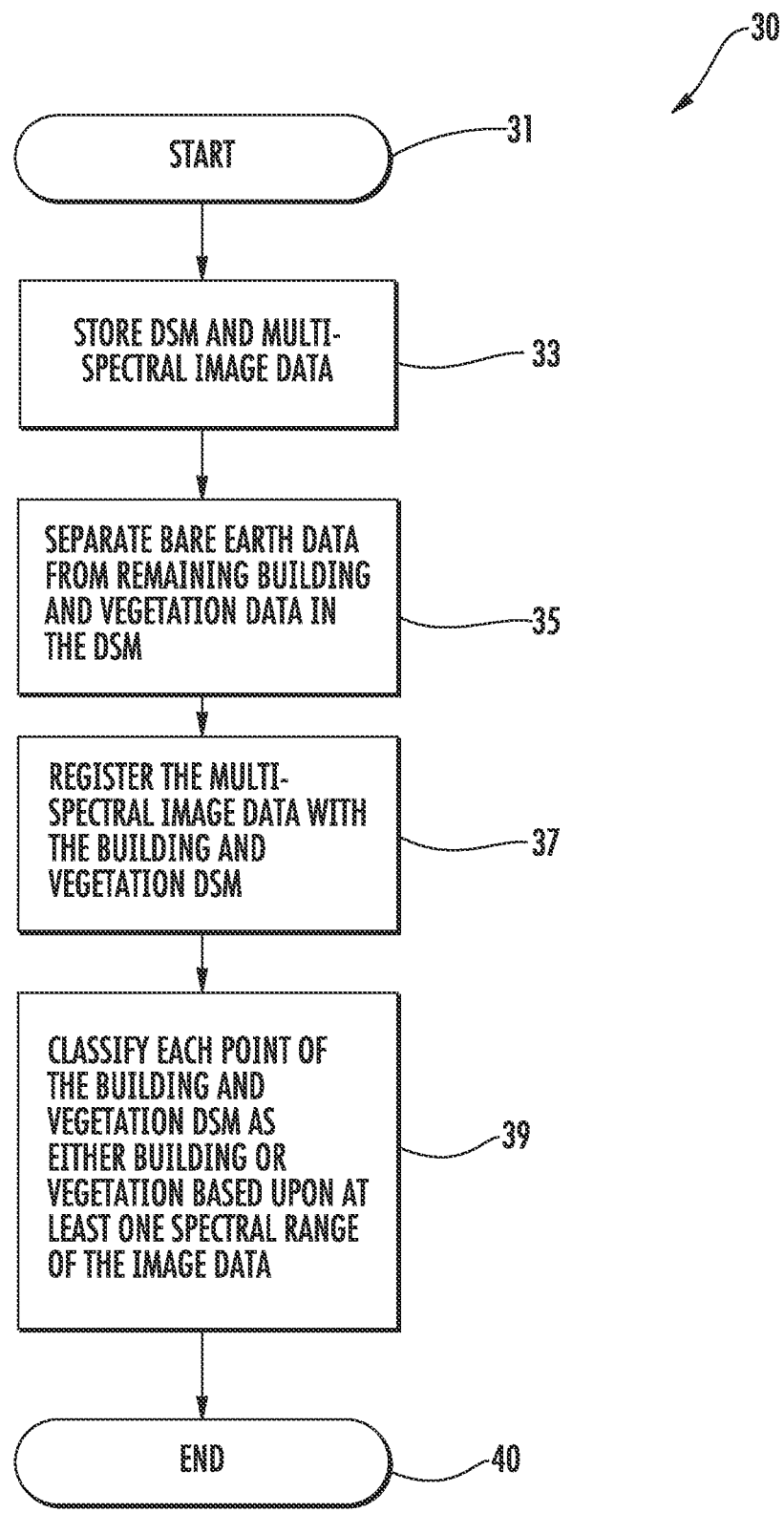
FIG. 3 is a flowchart illustrating a computer implemented method for geospatial modeling according to the present invention.
Figure 4:
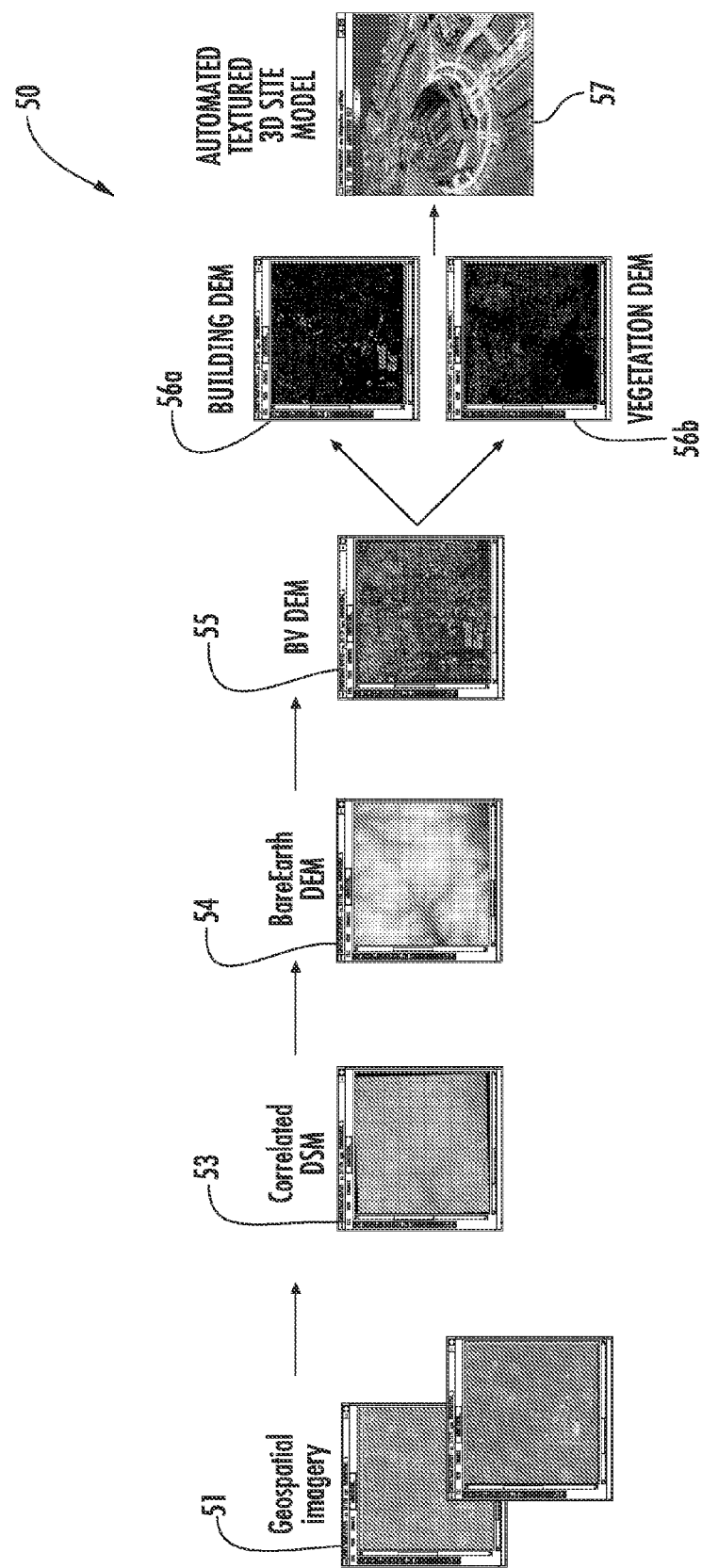
FIG. 4 is a diagram illustrating operation of the geospatial modeling system of FIG. 2.

Moreover, with reference to the flowchart 30 of FIG. 3 and to the diagram 50 of FIG. 4, another aspect directed to a computer implemented method for geospatial modeling is also now described, which begins at Block 31. At Block 33, the geospatial model database 21 is illustratively configured to store a digital surface model (DSM) 53 of a geographical area. For example, the DSM of the geographical area may comprise a stereographic DSM, i.e. the DSM is generated via overlapping images. Additionally, the DSM 53 may comprise at least one of a light detection and ranging (LIDAR) model, a Shuttle Radar Topography Mission (SRTM) model, and a synthetic-aperture radar (SAR) model, for example. In some embodiments, the processor 22 may generate the DSM using the method disclosed in U.S. Patent Application Publication No. 2007/0265781 to Nemethy et al., also assigned to the assignee of the present invention, and the entire contents of which are incorporated by reference herein.

At Block 33, the geospatial model database 21 is illustratively configured to store image data 51 of the geographical area. The image data 51 may have at least one spectral range indicative of a difference between buildings and vegetation. Also, the image data 51 may, for example, comprise a two-dimensional (2D) aerial earth image, an electric optical (EO) image, and/or an optical satellite image.

In particular, in some embodiments, the image data 51 may comprise multi-spectral image data, for example, red and near-infrared spectrum data. In other embodiments, the image data may comprise at least one of red, green, and blue (RGB) image data.

At Block 35, the processor 22 is illustratively configured to separate bare earth data 54 from remaining building and vegetation data in the DSM 53 to define a building and vegetation DSM 55. In other words, the processor 22 removes the ground points from the DSM 53. As will be appreciated by those skilled in the art, the processor 22 may use any suitable method to remove the ground points from the DSM 55.

In certain advantageous embodiments, the processor 22 may separate the bare earth data 54 by using the method disclosed in: U.S. Pat. No. 7,142,984 to Rahmes et al.; and U.S. Pat. No. 7,298,891 to McDowall et al., all incorporated herein by reference in their entirety and all also assigned to the assignee of the present invention.

Figure 8:
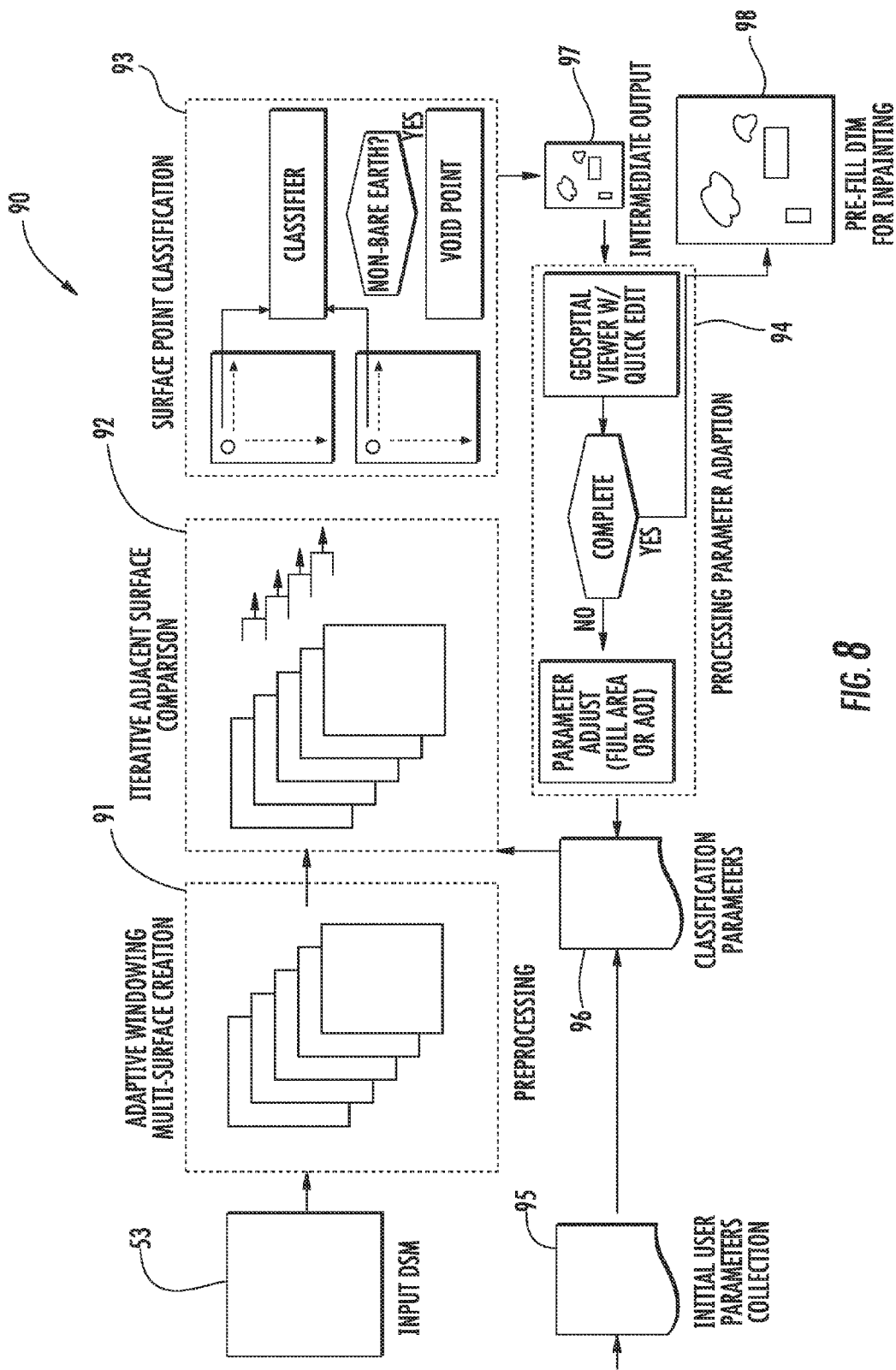
FIG. 8 is a schematic diagram of a bare earth extraction method of the geospatial modeling system according to the present invention.

Referring now briefly to FIG. 8 and diagram 90 therein, in other embodiments, the processor 22 may separate the bare earth data 54 by performing the following steps. In particular, the processor 22 may receive the DSM 53 and may perform an adaptive windowing multi-surface creation pre-processing thereon (Block 91). This pre-processing may be based upon initial user set parameters 95. The processor 22 may create a surface collection (all same resolution versus re-sampling techniques) using an iterative window opening technique (Block 92). The processor 22 performs iterative adjacent surface comparison on the pre-processed windows, i.e. the processor 22 records all possible significant deltas between surfaces.

The processor 22 then classifies each point as non-bare earth/bare earth and voids points classified as non-bare earth data (Block 93). This produces an intermediate bare earth DSM 97, which may be used to provide feedback 96 for adjusting the initial user set parameters 95 (Block 94). In particular, the intermediate bare earth DSM 97 is updated to a geospatial viewer for quick analysis by the user for allowing quick edit capability using null and un-null capabilities. This preprocessing step allows the user to apply a full set of new parameters back into the extraction step and see updated results in orders of magnitude and offers time savings (over full processing time). Also, this preprocessing step may allow the user to perform parameter changes and reapplication to an area of interest (AOI) drawn in the geospatial viewer and to place back through the extraction (Block 94). The processor 22 may perform a void fill operation on the intermediate bare earth DSM, i.e. inpainting (Block 98).

Referring again now to FIGS. 1-4, at Block 37, the processor 22 is illustratively configured to register the image data 51 with the building and vegetation DSM 55. In other words, and as will be appreciated by those skilled in the art, the processor 22 geolocates the image data 51 with the building and vegetation DSM 55. In certain embodiments, the processor 22 may use the geolocation functionality provided by the LiteSite® system.

As mentioned above, generally, the processor 22 is configured to classify each point of the building and vegetation DSM 55 as either building 56a or vegetation 56b based upon the at least one spectral range of the image data. This provides greater functionality for a user of the geospatial modeling system 20.

More particularly, the process of classifying each point of the building and vegetation DSM 55 illustratively includes several steps. Initially, the processor 22 is illustratively configured to correlate a plurality of image pixels from the image data 51 to a given point in the building and vegetation DSM 55. Of course, this presumes the typical scenario where the image data 51 of the geographical area has a greater resolution than that of the building and vegetation DSM 55, i.e. more than one pixel in the image data is geospatially associated with each point in the building and vegetation DSM.

For the given point, the processor 22 illustratively forms a voting space including the correlated plurality of image pixels from the image data 51. Further, at Block 39, the processor 22 illustratively classifies each pixel of the voting space as either building or vegetation based upon comparison to a threshold.

More specifically, the processor 22 illustratively determines the given point as vegetation if a majority of the plurality of image pixels of the voting space is classified as vegetation. The processor 22 illustratively determines the given point as a building if a majority of the plurality of image pixels of the voting space is classified as building. In other embodiments, particularly those where the image data 51 includes RGB values, the pixel of image data may be classified using the green value from the RGB values, for example, by performing a threshold operation on the green values for each image data 51 pixel. Once the building and vegetation points of the DSM 53 have been separated, the user is provided with an advantageous textured 3D model 57. The method ends at Block 40.

Referring briefly to FIGS. 5A and 5B, for example, in some embodiments, the classifying of each pixel of the image data 51 may comprise determining a normalized difference vegetation index value for each pixel. Particularly, the geospatial modeling system 20 may ingest a false colored multi-spectral image 60 and generate a vegetation mask image 61 using a process based upon the normalized difference vegetation index value, as will be appreciated by those skilled in the art. Moreover, such normalized difference vegetation index function may be provided by the LiteSite® system.

Advantageously, the geospatial modeling system 20 may separate building 56a and vegetation 56b in most DSMs, in particular, stereographic DSMs. Indeed, the geospatial modeling system 20 can readily accomplish this task using automated computer processes and without the need for manual user based assistance/modification. Accordingly, the disclosed method provides a more cost effective and timely process than the prior art.

Figure 6A:
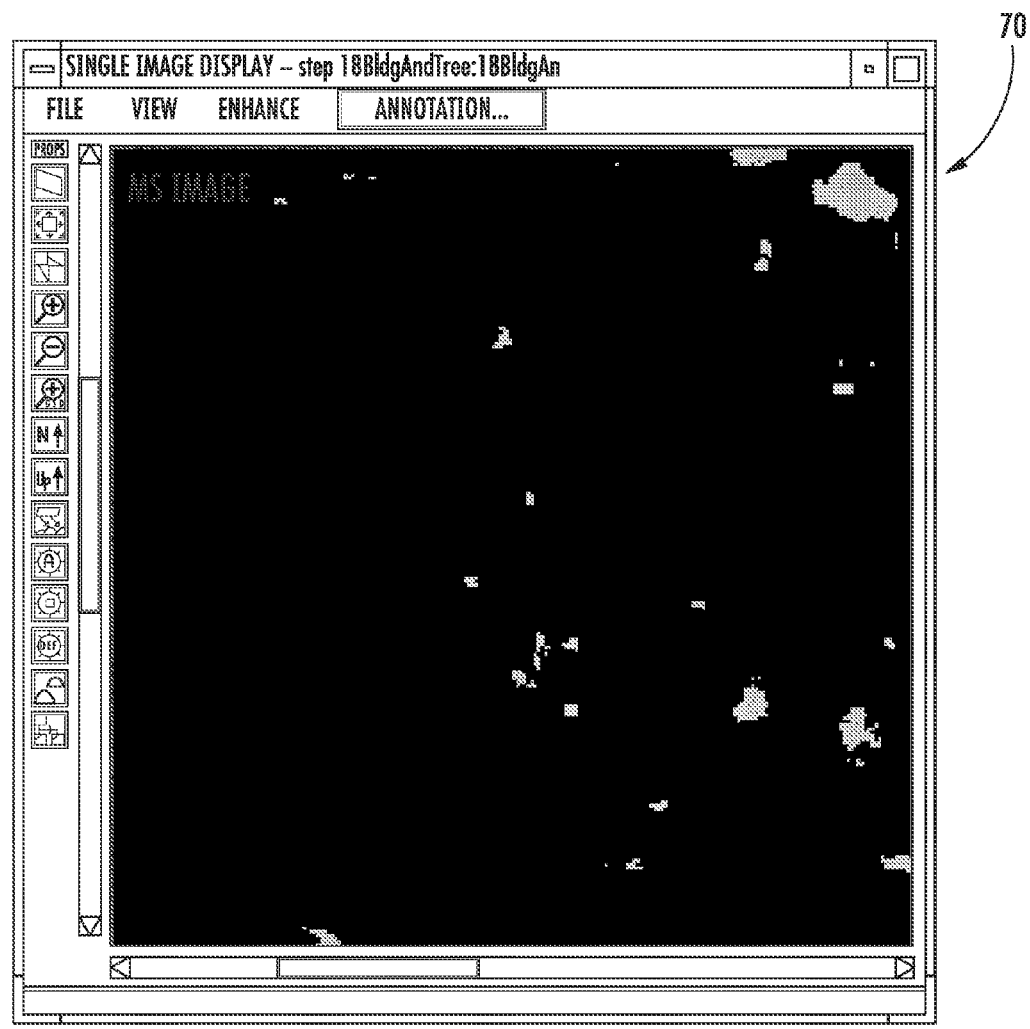
FIGS. 6A, 6B, and 6C are images illustrating a vegetation mask for a geographical area from a system according to the prior art, a multi-spectral image of the geographical area in the geospatial modeling system of FIG. 2, and a vegetation mask for the geographical area in the geospatial modeling system of FIG. 2, respectively.
Figure 6C:
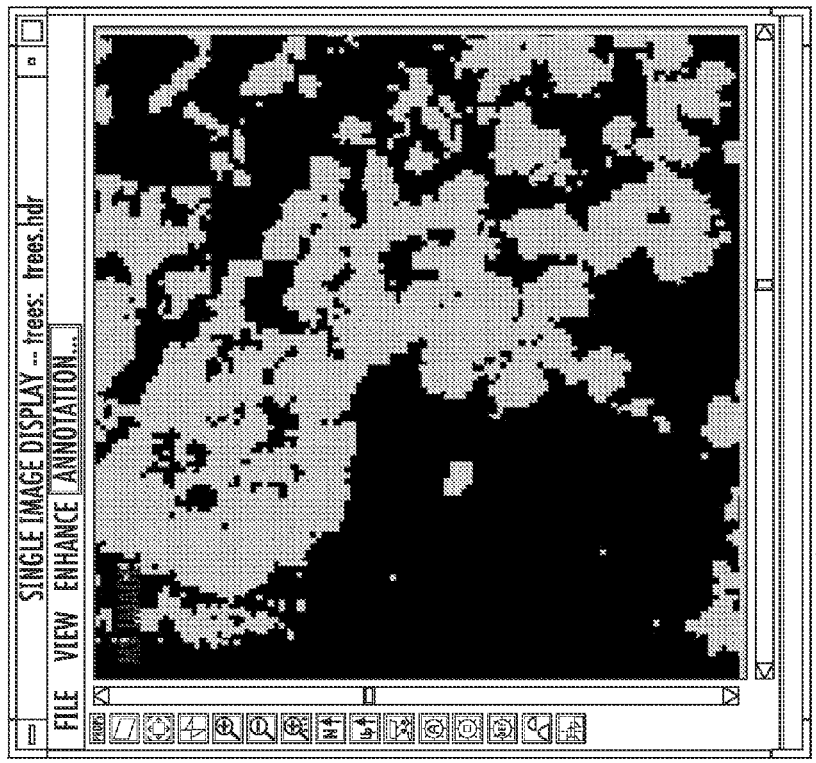
Figure 6B:
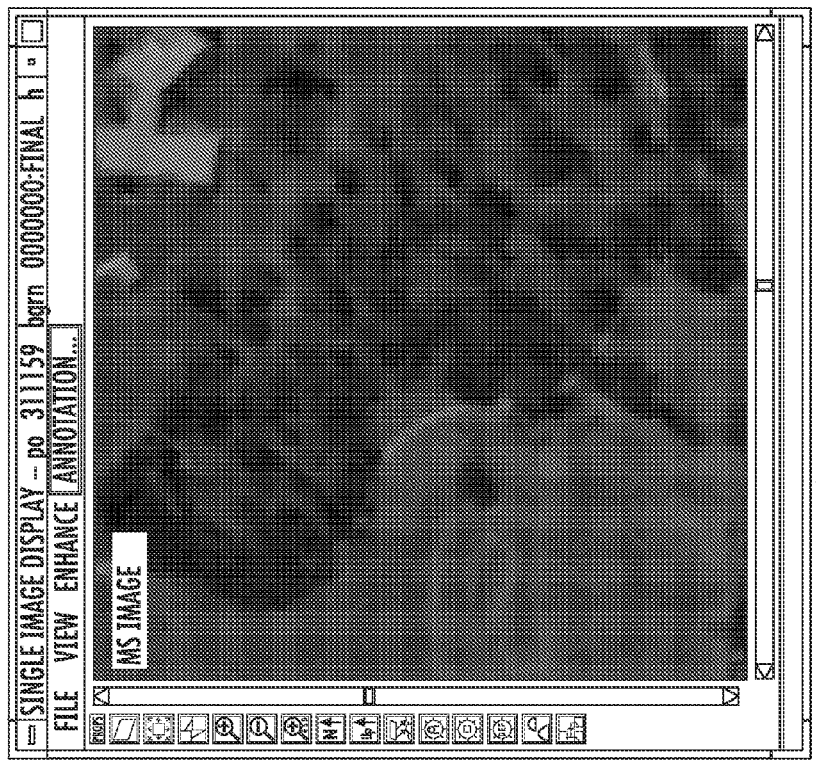

Referring now to FIGS. 6A-6C, a simulation of results from the geospatial modeling system 20 and a prior art system are now described. Image 70 shows the vegetation mask for a geographical area using typical methods. Image 71 shows a multi-spectral image of the geographical area in the geospatial modeling system 20. After processing by the processor 22, the vegetation mask shown in image 72 is provided, which includes substantially more of the vegetation data omitted by the vegetation mask in the prior art system.

Figure 7:
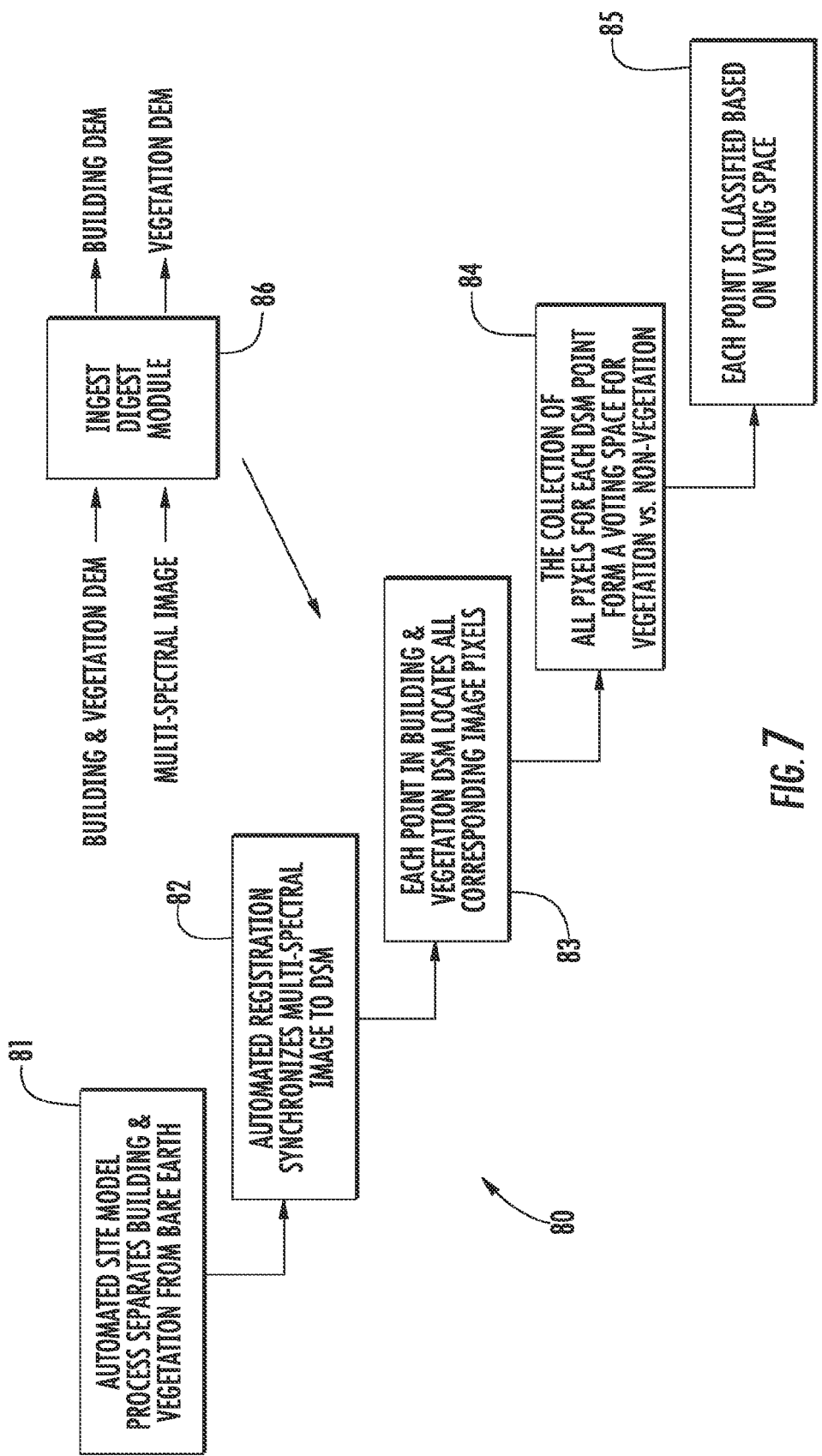
FIG. 7 is a schematic diagram of another embodiment of the geospatial modeling system according to the present invention.

Referring now additionally to FIG. 7, another embodiment of the geospatial modeling system 80 is now described. The geospatial modeling system 80 illustratively includes an automated site module 81 for separating the bare earth data 54 from the building and vegetation DSM 55, and an automated registration module 82 cooperating therewith for registering the image data 51 with the building and vegetation DSM.

The geospatial modeling system 80 illustratively includes a correlation module 83 for correlating points in the image data 51 to the building and vegetation DSM 55, and a voting space module 84 cooperating therewith for forming a voting space of the correlated pixels in the image data. Furthermore, the geospatial modeling system 80 illustratively includes a voting module 85 where each pixel in the voting space votes either building or vegetation in classification. Lastly, the geospatial modeling system 80 illustratively includes an ingest/digest module 86 receiving the building and vegetation DSM 55 and the image data 51, and outputting separately the building DSM 56a and the vegetation DSM 56b.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
   a geospatial model database configured to
      store a digital surface model (DSM) of a geographical area, and
      store image data of the geographical area, the image data having at least one spectral range indicative of a difference between buildings and vegetation; and
   a processor cooperating with said geospatial model database and configured to
      separate bare earth data from remaining building and vegetation data in the DSM to define a building and vegetation DSM,
      register the image data with the building and vegetation DSM,
      correlate a plurality of image pixels from the image data to a given point in the building and vegetation DSM,
      form a voting space including the correlated plurality of image pixels, and
      classify each point of the building and vegetation DSM as either building or vegetation based upon the at least one spectral range of the image data, the classifying comprising
         classifying each pixel of the voting space as either building or vegetation based upon comparison to a threshold, and
         determining the given point as vegetation if a majority of the voting space is classified as vegetation and determining the given point as a building if a majority of the voting space is classified as building.

2. The geospatial modeling system according to claim 1 wherein classifying each pixel comprises determining a normalized difference vegetation index value for each pixel of the image data.

3. The geospatial modeling system according to claim 1 wherein the DSM of the geographical area comprises a stereographic DSM.

4. The geospatial modeling system according to claim 1 wherein the image data comprises at least one of red, green, and blue (RGB) image data.

5. A geospatial modeling system comprising:
a geospatial model database configured to
store a digital surface model (DSM) of a geographical area, and
store multi-spectral image data of the geographical area, the multi-spectral image data having at least one spectral range indicative of a difference between buildings and vegetation; and
a processor cooperating with said geospatial model database and configured to
separate bare earth data from remaining building and vegetation data in the DSM to define a building and vegetation DSM,
register the multi-spectral image data with the building and vegetation DSM,
correlate a plurality of image pixels from the multi-spectral image data to a given point in the building and vegetation DSM,
form a voting space including the correlated plurality of image pixels, and
classify each point of the building and vegetation DSM as either building or vegetation based upon the voting space and at least one spectral range of the multi-spectral image data.

6. The geospatial modeling system according to claim 5 wherein the multi-spectral image data comprises red and near-infrared spectrum data.

7. The geospatial modeling system according to claim 5 wherein said processor is configured to classify each point of the building and vegetation DSM by at least:
classifying each pixel of the voting space as either building or vegetation based upon comparison to a threshold; and
determining the given point as vegetation if a majority of the plurality of image pixels of the voting space is classified as vegetation and determining the given point as a building if a majority of the plurality of image pixels of the voting space is classified as building.

8. The geospatial modeling system according to claim 7 wherein classifying each pixel comprises determining a normalized difference vegetation index value for each pixel of the multi-spectral image data.

9. The geospatial modeling system according to claim 5 wherein the DSM of the geographical area comprises a stereographic DSM.

10. A computer implemented method for geospatial modeling using a geospatial model database to store a digital surface model (DSM) of a geographical area, and to store image data of the geographical area, the image data having at least one spectral range indicative of a difference between buildings and vegetation, the method comprising:
using a processor to separate bare earth data from remaining building and vegetation data in the DSM to define a building and vegetation DSM;
using the processor to register the image data with the building and vegetation DSM;
using the processor to correlate a plurality of image pixels from the image data to a given point in the building and vegetation DSM;
using the processor to form a voting space including the correlated plurality of image pixels;
and
using the processor to classify each point of the building and vegetation DSM as either building or vegetation based upon the at least one spectral range of the image data, the classifying comprising
classifying each pixel of the voting space as either building or vegetation based upon comparison to a threshold, and
determining the given point as vegetation if a majority of the voting space is classified as vegetation and determining the given point as a building if a majority of the voting space is classified as building.

11. The computer implemented method according to claim 10 wherein the processor classifies each pixel by at least determining a normalized difference vegetation index value for each pixel of the image data.

12. The computer implemented method according to claim 10 wherein the DSM of the geographical area comprises a stereographic DSM.

13. The computer implemented method according to claim 10 wherein the image data comprises multi-spectral image data.

14. The computer implemented method according to claim 13 wherein the multi-spectral image data comprises red and near-infrared spectrum data.

15. The computer implemented method according to claim 10 wherein the image data comprises at least one of red, green, and blue (RGB) image data.

* * * * *